(12) United States Patent
Tanaka et al.

(10) Patent No.: US 6,409,373 B1
(45) Date of Patent: *Jun. 25, 2002

(54) CONTINUOUS KNEADER, ROTOR FOR MATERIAL DISCHARGING

(75) Inventors: Tatsuya Tanaka; Katsunori Takahashi; Masahiko Kashiwa; Yoshinori Kuroda; Shigehiro Kasai, all of Takasago (JP)

(73) Assignee: Kobe Steel, Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/318,723

(22) Filed: May 26, 1999

(30) Foreign Application Priority Data

May 27, 1998 (JP) .............................. 10-146066

(51) Int. Cl.⁷ ................................ B01F 7/08; B29B 7/46
(52) U.S. Cl. ........................................................ 366/84
(58) Field of Search .............................. 366/77, 79, 84, 366/88, 90, 96, 97, 98, 99, 100, 195, 196, 194, 322, 323

(56) References Cited

U.S. PATENT DOCUMENTS

| | | | |
|---|---|---|---|
| 4,681,457 A | * | 7/1987 | Orimo et al. |
| 5,462,426 A | | 10/1995 | Imamura |
| 5,829,872 A | | 11/1998 | Mizuguchi et al. |
| 5,863,117 A | * | 1/1999 | Gheorghita |

FOREIGN PATENT DOCUMENTS

| | | |
|---|---|---|
| DE | 750 509 | 1/1945 |
| EP | 0 391 003 | * 10/1990 |
| EP | 0 850 738 | 7/1998 |
| JP | 56-031433 | 3/1981 |
| JP | 56-158135 | 12/1981 |
| JP | 58-191118 | 11/1983 |
| JP | 59-213430 | 12/1984 |
| JP | 2-263609 | 10/1990 |
| JP | 9-001630 | 1/1997 |

* cited by examiner

Primary Examiner—Charles E. Cooley
Assistant Examiner—David Sorkin
(74) Attorney, Agent, or Firm—Oblon, Spivak, McClelland, Maier & Neustadt, P.C.

(57) ABSTRACT

A continuous kneader is disclosed wherein rotors each having a material feed section and a kneading section on the outer peripheral surface thereof are inserted rotatably into a chamber while being supported at both axial ends thereof, the said chamber having a material supply port at one end portion thereof, a discharge section is formed at an end portion of each rotor opposite to the material supply side for scraping out the material after kneaded by the rotor radially outwards of the rotor, and a discharge port for discharging the kneaded material thus scraped out in the discharge section of each rotor to the exterior of the chamber is formed in the opposite end portion of the chamber so as to be open radially outwards of the rotor, the discharge section of each rotor having on its outer peripheral surface a twist flight which is inclined in a direction of extruding the kneaded material to the opposite end side of the chamber with rotation of the rotor.

6 Claims, 15 Drawing Sheets

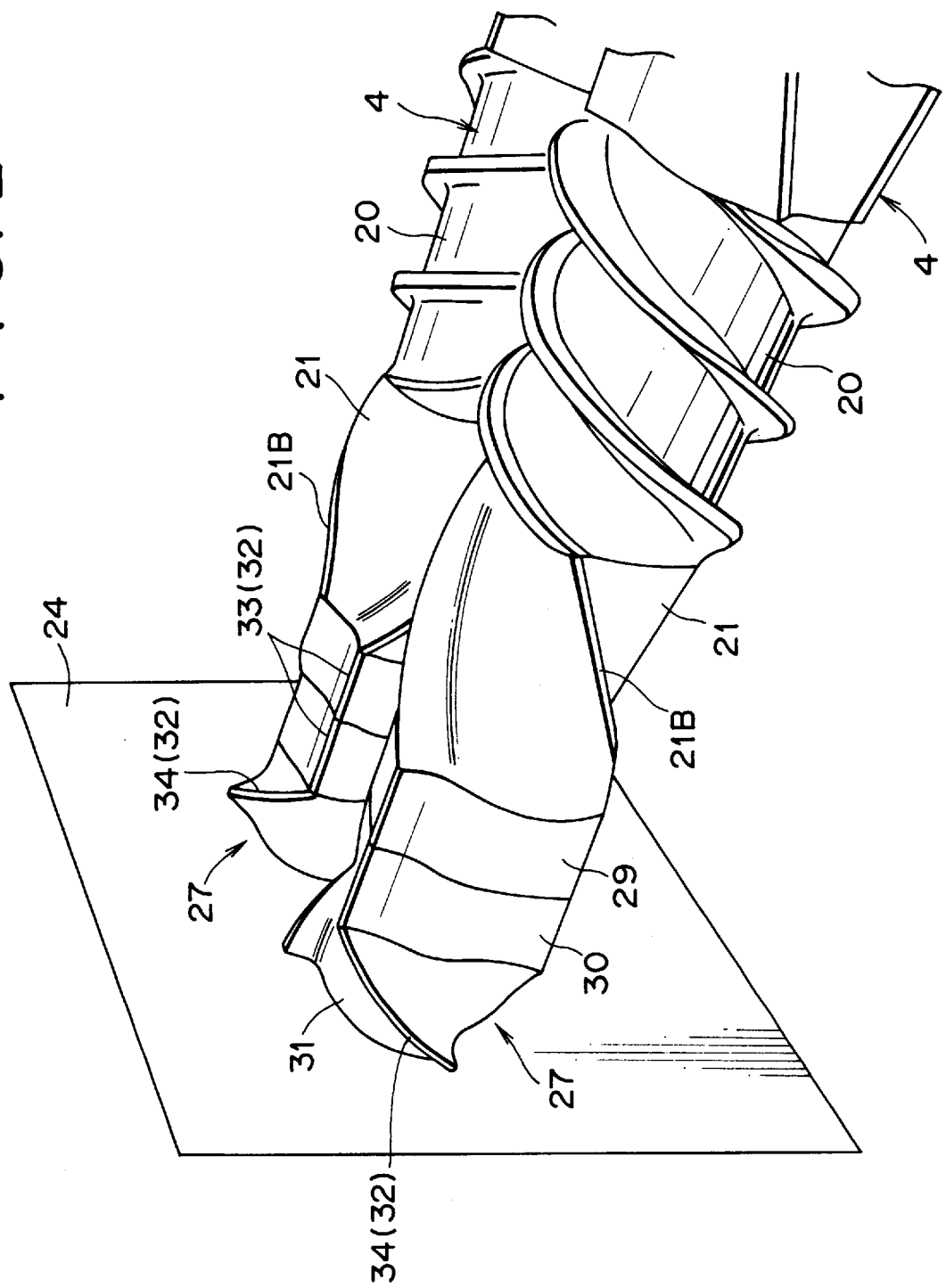

400rpm, OUTPUT 40kg/h, SUCTION PRESSURE 3kgf/cm2

| RATIO | 0 | 0.25 | 0.5 | 0.75 | 1 |
|---|---|---|---|---|---|
| TEMPERATURE DIFFERENCE | 29 | 22 | 15 | 12 | 10 |

| RATIO | 0 | 0.25 | 0.5 | 0.75 | 1 |
|---|---|---|---|---|---|
| NUMBER OF GELS | 10 | 11 | 13 | 18 | 25 |

| 400rpm, OUTPUT 60kg/h, SUCTION PRESSURE 3kgf/cm2 | | | | | |
|---|---|---|---|---|---|
| RATIO | 0 | 0.25 | 0.5 | 0.75 | 1 |
| TEMPERATURE DIFFERENCE | 33 | 23 | 16 | 12 | 10 |

| RATIO | 0 | 0.25 | 0.5 | 0.75 | 1 |
|---|---|---|---|---|---|
| NUMBER OF GELS | 15 | 18 | 22 | 30 | 40 |

FLOW RATE DISTRIBUTION

CONTINUOUS KNEADER, ROTOR FOR MATERIAL DISCHARGING

BACKGROUND OF THE INVENTION

1. Field of the Invention

The present invention relates to a continuous kneader for kneading a polymeric resin material such as a plastic material or rubber, as well as a material discharging method and rotor for use in the continuous kneader.

2. Description of the Related Art

In a continuous kneader, usually a material to be kneaded such as a plastic material or rubber is subjected to a strong shearing action with use of rotors which are rotating in different directions at a high speed and is thereby melted into a plasticized state in a short time. Various fillers and additives are kneaded and dispersed efficiently into the thus-plasticized resin. In this way there can be produced resin products of various qualities.

Particularly, in a continuous kneader of a both-end supported structure wherein rotors are each supported at both axial ends thereof by means of bearings, there is no fear of tip-vibration of each rotor and contact of the rotor tip with a chamber. Therefore, the rotors can be rotated at a high speed and a kneading and pelletizing equipment of a high production capacity can be realized easily.

In a twin-rotor type continuous twin-screw kneader as such a both-end supported type continuous kneader, a pair of right and left rotors each having a feed portion and a kneading portion for a material to be kneaded are inserted into a chamber rotatably while being supported at both axial ends thereof, the said chamber having a material supply port at one end thereof, the said rotors each having at one end thereof a discharge section (discharge flights) for scraping out the material radially outwards after having been kneaded by the rotors, and the said chamber having at the opposite end thereof a discharge port formed radially outwards for discharging the kneaded material to the exterior of the chamber after having been scraped out by the discharge section (see, for example, Japanese Patent Publication Nos. 58-50533 and 6-41135, all of which are hereby fully incorporated by reference).

In the both-end supported type continuous twin-screw kneader, as referred to above, the front end portion of the chamber cannot be opened and the discharge port cannot help being opened radially outwards, so the kneaded material flowing within the chamber toward the downstream side in the axial direction of the rotors is scraped out radially outwards of the rotors by the discharge sections (discharge flights) of the rotors upon arrival at the area (hereinafter referred to as the "discharge area") corresponding to the discharge port in the chamber and its flowing direction is changed from the rotor axis direction into a direction nearly perpendicular thereto.

In the conventional continuous twin-screw kneader, since the amount of projection of each rotor discharge section is set the same for both rotors in the rotor axis direction, the kneaded material stuffed between the inner surface of the chamber and the discharge sections of the rotors become higher in temperature under a shearing force induced by rotation of the rotors, which may result in that the temperature of the kneaded material present in the discharge port becomes non-uniform in the rotor axis direction.

More particularly, when the kneaded material flowing in the rotor axis direction is discharged radially outwards at the downstream end of the chamber, there exist a flow advancing to the exterior directly from the upstream side of the discharge port and a flow going out after staying in the discharge area up to the downstream end of the chamber. For example, as shown in FIG. 15, the flow rate distribution of the kneaded material in the discharge port is smaller on the downstream side (the right-hand side in FIG. 15).

On the other hand, a resin pipe connected to the discharge area or the discharge port in the chamber is usually filled with the kneaded material, so in the case where the amount of projection of each rotor discharge section is the same for both rotors in the rotor axis direction, a shearing work done which the kneaded material present in the discharge area undergoes from the discharge flights with rotation of the rotors changes little in the rotor axis direction.

Thus, the shearing work done imposed on the kneaded material in the discharge area is almost constant despite the flow rate distribution of the material being smaller on the downstream side. It follows that the shearing work done imposed on the kneaded material per unit weight is larger on the downstream side of the discharge port. Consequently, as shown in the upper graph in FIG. 15, a relatively large temperature difference ΔT arises between the kneaded resin passing upstream through the discharge port and the kneaded resin passing downstream through the discharge port.

Once there arises a large temperature difference ΔT in the melted resin present in the discharge port, there may be obtained a kneaded product held at a desired temperature on the upstream side of the discharge port, but on the downstream side of the same port the temperature of the kneaded product will become too high and decomposition of part of the kneaded product and deterioration in quality of the product may result. Besides, there also arises the problem that pellets extruded from a die (a pelletizer) which follows become non-uniform in length due to a difference in viscosity caused by the difference in temperature.

On the other hand, the invention disclosed in Japanese Patent Laid Open No. 9-1630 recommends that the downstream end portion of each rotor be formed in a columnar shape free of discharge flights as means for preventing the resin temperature from becoming non-uniform in the discharge port referred to above (see claim 1 in the said laid-open print).

If the discharge flights are removed from the downstream ends of rotors into a bald state, the irregularity of the resin temperature in the discharge port will be corrected, but there no longer is the resin scraping-out function in the discharge area and therefore a certain viscosity of the kneaded material may give rise to a large pressure variation in the discharge port.

Thus, where the above means of making the discharge sections of the rotors into bald sections free of discharge flights is adopted, it is necessary that the rotors are rotated at a high speed in order to ensure a sufficient power for feeding melted resin under pressure, giving rise to a new problem that a gear pump extending from the discharge port to the downstream side is difficult to be operated in a normal condition and that operating conditions for the continuous kneader become narrower.

According to the means of making the discharge sections of rotors into bald sections free of discharge flights, the resin is no longer present uniformly in the inlet of a viscoseal disposed at the opposite end wall of the chamber, so that the resulting decrease of output makes it no longer possible to seal the resin by the viscoseal and the flow of resin to the discharge port becomes too smooth. As a result, particularly in the case of two-stage kneading (kneading is performed also on the downstream side of a gate device), the resin will flow through the second kneading section without stopping and is difficult to stay therein, so that the gel removing capacity may be deteriorated markedly.

SUMMARY OF THE INVENTION

It is an object of the present invention to effectively prevent the occurrence of a trouble in the operation of a gear pump due to a pressure variation in the discharge port, also prevent a decrease of the gel removing capacity caused by non-stop flowing of the resin through the kneading section, and at the same time minimize the temperature difference in the rotor axis direction of the kneaded material in the discharge sections of the rotors, thereby improving the product quality.

A discharge section of each rotor in a preferred embodiment of the present invention is characterized by being provided on its outer peripheral surface with twist flights inclined in a direction in which a material after kneading is extruded to an opposite side of a chamber with rotation of the rotor.

In this case, since a portion or the whole of the kneaded material present in the discharge area is discharged from the discharge port while being extruded to the opposite side (downstream side) of the chamber by the twist flights, the difference in the discharge flow rate between the upstream side and the downstream side of the discharge port decreases and an offset of the flow rate distribution in the discharge port becomes smaller, resulting in that a shearing work done per unit weight imposed on the kneaded material flowing through the discharge port is rendered almost uniform in the rotor axis direction.

In the present invention, unlike the invention disclosed in Japanese Patent Laid Open No.1630/97, it is not that the kneaded material scraping-out function is removed completely from the discharge sections of rotors, but the discharge sections still possess the said function, so that the occurrence of a large pressure variation in the discharge port is prevented and the deterioration of the gel removing capacity caused by non-stop flow of the resin from the discharge area toward the discharge port is also prevented.

In the present invention it is preferred that the twist angle of each twist flight relative to the rotor axis direction be set at a value in the range of 30° to 70°.

The reason is that if the twist angle of each twist flight is smaller than 30°, the twist flight assumes a shape similar to a parallel flight in the conventional like kneader and there arises a fear that the temperature difference in the discharge port may not be lowered to an extent of not affording defective pellets. The reason is also because if the twist angle of each twist flight exceeds 70°, there arises a fear that the kneaded material may become easier to pass through the kneading section without stopping and the percentage gel removed may become lower.

In the present invention it is preferred that the discharge section be provided on its outer peripheral surface with parallel flights positioned on an upstream side of the twist flights and it is also preferred that the twist flights extend throughout the whole axial region of the discharge section.

In the former case, it is desirable that the ratio of length of the twist flights in the rotor axis direction relative to the discharge section be set at a value in the range of 0.2 to 0.8.

The reason is that if the above ratio of length of the twist flights is smaller than 0.2, the greater part of the discharge section is constituted by parallel flights and that therefore it may become impossible to diminish the temperature difference in the discharge port to an extent of not affording defective pellets. The reason is also because if the above ratio of the twist flights exceeds 0.8, the parallel flights which induce a flow resistance of the resin in the discharge section will become too short and therefore it becomes easier for the kneaded material to pass the kneading section without stopping, which leads to deterioration of the percentage gel removed.

BRIEF DESCRIPTION OF THE DRAWINGS

FIG. 2 is a perspective view of rotors located in the downstream portion;

DESCRIPTION OF THE PREFERRED EMBODIMENTS

Continuous kneaders according to preferred embodiments of the present invention will be described hereinunder with reference to FIGS. 1 to 14b.

FIGS. 1 to 4 illustrate a two-rotor type continuous twin-screw kneader according to the first embodiment of the present invention.

Figure 4:
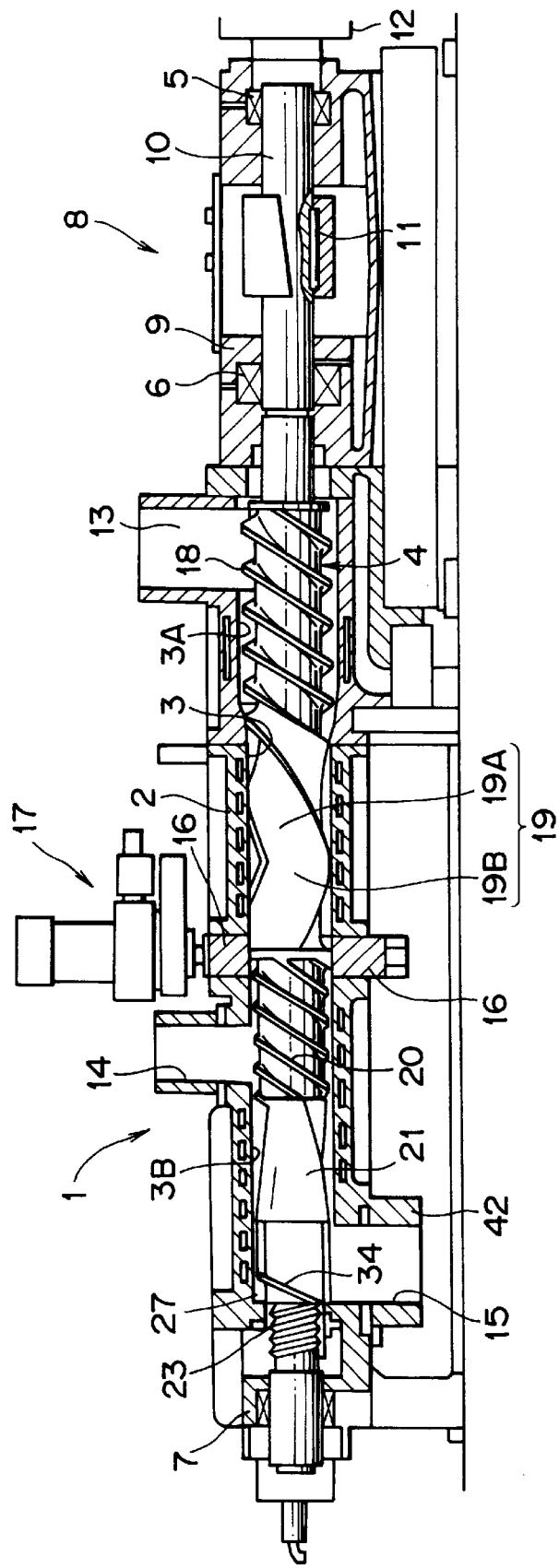
FIG. 4 is a sectional side view showing the entire structure of the continuous twin-screw kneader.

As shown in FIG. 4, the continuous twin-screw kneader 1 according to this embodiment is provided with a chamber 2 as a machine body, and within the chamber 2 are formed two, longitudinally extending, generally cylindrical kneading chambers 3 in communication with each other and generally in the shape of eyeglass holes in section.

Into the kneading chambers 3 formed within the chamber 2 are inserted a pair of right and left rotors 4 rotatably in parallel with each other for feeding a material to be kneaded from one end side (upstream side, right-hand side in FIG. 4) of the chamber 2 toward the opposite end side (downstream side, left-hand side in FIG. 4) and for kneading and melting the material during the feed.

The two rotors 4 are supported rotatably at both their axial ends through bearings 5, 6 and 7 disposed on both up- and downstream sides of the chamber 2 and are rotated in directions opposite to each other so that their opposed inner sides move from upper to lower positions.

A drive unit 8 for the rotors 4 is connected to the upstream end of the chamber 2. The drive unit 8 comprises a casing 9 connected in tandem to the upstream end of the chamber 2, a pair of front and rear bearings 5, 6 which rotatably support the driving shaft portion 10 of each rotor 4 inserted into the casing 9, and a driving gear 11 fixed to an intermediate position in the axial direction of the driving shaft portion 10.

The driving shaft portion 10 of one of the paired rotors 4 is further projected to the upstream side of the casing 9 and the projected end portion thereof is connected to a motor 12 equipped with a reduction mechanism. The driving gears 11 of the rotors 4 are in direct mesh with each other so that when one rotor is rotated by the motor 12, the other rotor 4 rotates in a direction different from the rotating direction of one rotor.

A supply port 13 for supplying a powdered material to be kneaded into the kneading chambers 3 is formed in the upper surface of an upstream end portion of the chamber 2 and a hopper (not shown) is connected to the supply port 13. In an intermediate position of the chamber 2 is formed a vent hole 14 for allowing a gas generated during kneading to flow out of the kneading chambers 3 or for later feeding additives such as inorganic fillers.

In the lower surface of a downstream end portion of the chamber 2 is formed a discharge port 15 for discharging the melted and kneaded material to the exterior of the chamber 2. The discharge port 15 used in this embodiment is a lower discharge type port which opens radially downwards of the rotors 4.

In an intermediate position in the material conveying direction of the chamber 2 is disposed a gate device 17 having a pair of upper and lower gate plates 16. The gate plates 16 are moved radially toward or away from the outer peripheral portion of the rotors 4 to adjust the flow rate of the material being kneaded. The kneading chambers 3 formed in the chamber 2 are divided into two kneading stages 3A and 3B disposed in tandem on the upstream side and the downstream side, respectively.

On the outer peripheral surface of each rotor 4 inserted into the first stage 3A located on the upstream side of the gate device 17 there are formed, successively from the upstream side, a first feed section 18 constituted by screw flights for feeding forward the powdered material supplied from the supply port 13 and a first kneading section 19 for kneading and melting the powdered material by applying a strong shear force thereto.

In this embodiment, the first kneading section 19 is provided with a feed flight 19A which is twisted in a direction of extruding the material to the downstream side with rotation of the rotor 4 and a return flight 19B which is twisted in a direction of pushing the material back to the upstream side with rotation of the rotor. Each rotor 4 adopted in this embodiment is a single flight type rotor in which kneading flights and screw flights are formed at intervals of 120° in the circumferential direction.

On the other hand, on the outer peripheral surface of each rotor 4 inserted into the second stage 3B located on the downstream side of the gate device 17 there are formed, successively from the upstream side, a second feed section 20 constituted by screw flights for conveying the material melted in the first kneading section 19 forcibly toward the discharge port 15 and a second kneading section 21 which further applies a shearing force to the material to melt and knead the material.

The present invention is also applicable to a continuous kneader wherein only the second feed section 20 is formed on the outer peripheral surface of each rotor 4 positioned in the second stage 3B and a continuous kneader wherein only the second kneading section 21 is formed without forming the second feed section 20.

In this embodiment, the second kneading section 21 is provided with only a feed flight 21B (see FIG. 2) which is twisted in a direction of extruding the material to the downstream side with rotation of the associated rotor 4. It is not provided with a return flight.

A gear pump 22 (see FIGS. 5 to 7 to be referred to later) is connected to the underside of the discharge port 15 through a connecting pipe 42, and a pelletizer or another final processing device is connected to the discharge side of the gear pump 22. A continuous kneading and pelletizing system for a polymeric resin material is constituted by the continuous twin-screw kneader 1, the gear pump 22 and the pelletizer.

Figure 1:
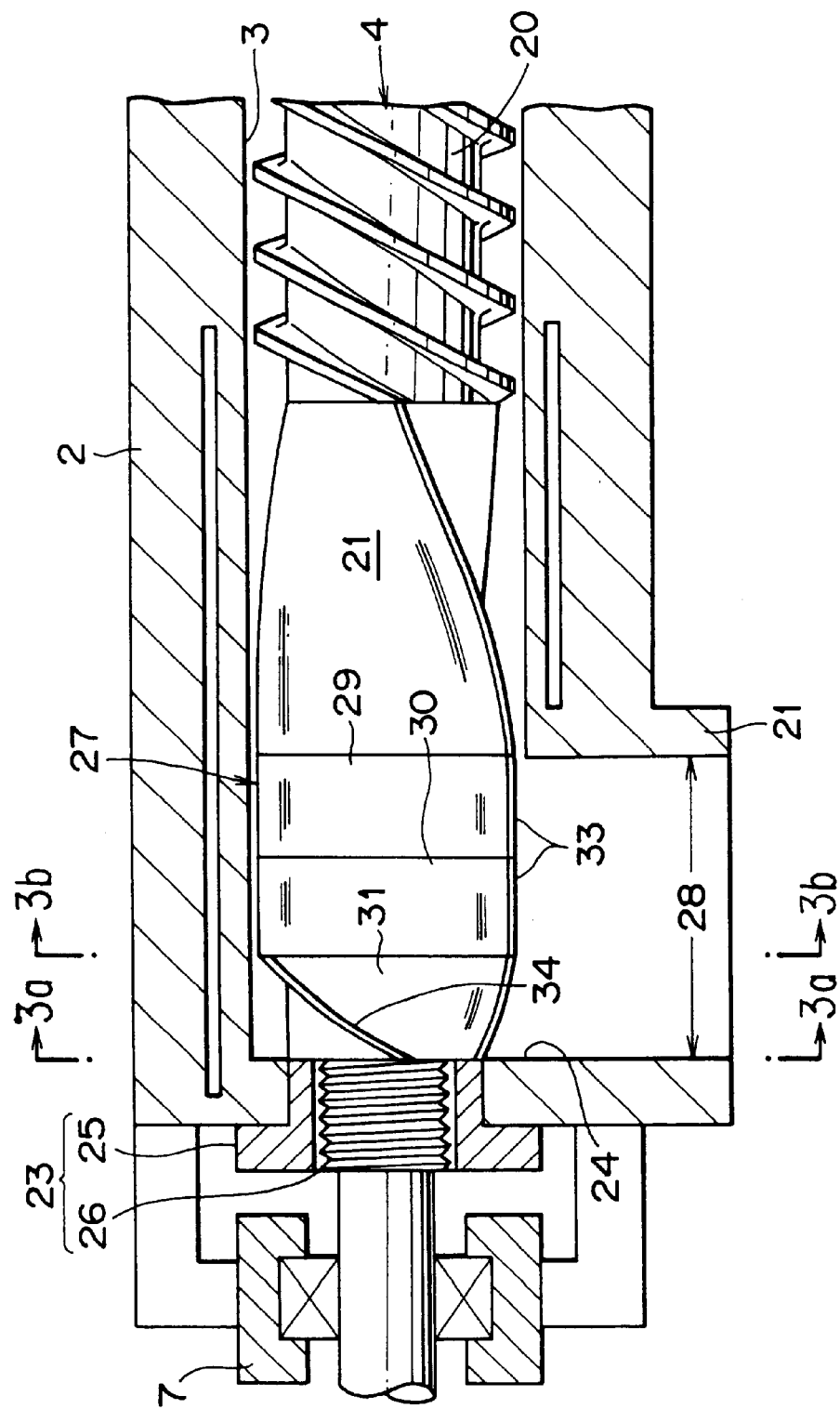
FIG. 1 is a sectional side view of a downstream portion of a continuous twin-screw kneader according to the first embodiment of the present invention.

As shown in FIG. 1, the downstream end portion of each rotor 4 projects through a viscoseal 23 to the exterior of the chamber 2. This projecting portion of the rotor is rotatably supported to the chamber 2 side by the downstream-side bearing 7 fixed to a vertical wall portion 24 which constitutes a downstream end face of the chamber 2.

The viscoseal 23 has a sealing cylinder portion 25 installed so as to extend through the downstream end face of the chamber 2 and an inverse thread portion 26 formed on the outer peripheral surface of the downstream end portion of each rotor 4 and inserted sidably into the sealing cylinder portion 25. The inverse thread portion 26 is formed in a direction in which its threads shift to the upstream side with rotation of the rotor 4.

The kneaded material which has entered the sealing cylinder portion 25 from the kneading chamber 3 is returned to the upstream side by a reverse feed action of the inverse thread portion 26, whereby the kneaded material is sure to be sealed in the rotating and sliding portion of the rotor 4.

As shown in FIGS. 1 and 4, a discharge section 27 for scraping out radially outwards the material which has been melted and kneaded in the kneading section 19 of each rotor 4 is formed on the outer peripheral surface of the downstream end of the rotor 4. The discharge section 27 is formed at approximately the same length as an axial length of the rotor in an area (a discharge area 28) wherein the discharge port 15 in the kneading chamber 3 is formed.

Figure 3A:
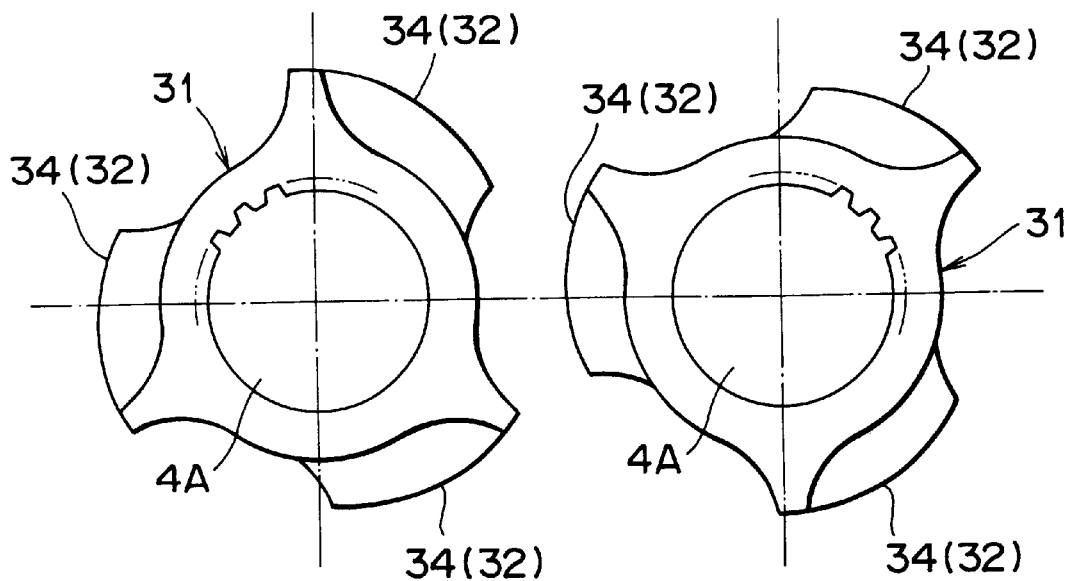
FIG. 3a is a sectional view taken on line, 3a—3a in FIG. 1
Figure 3B:
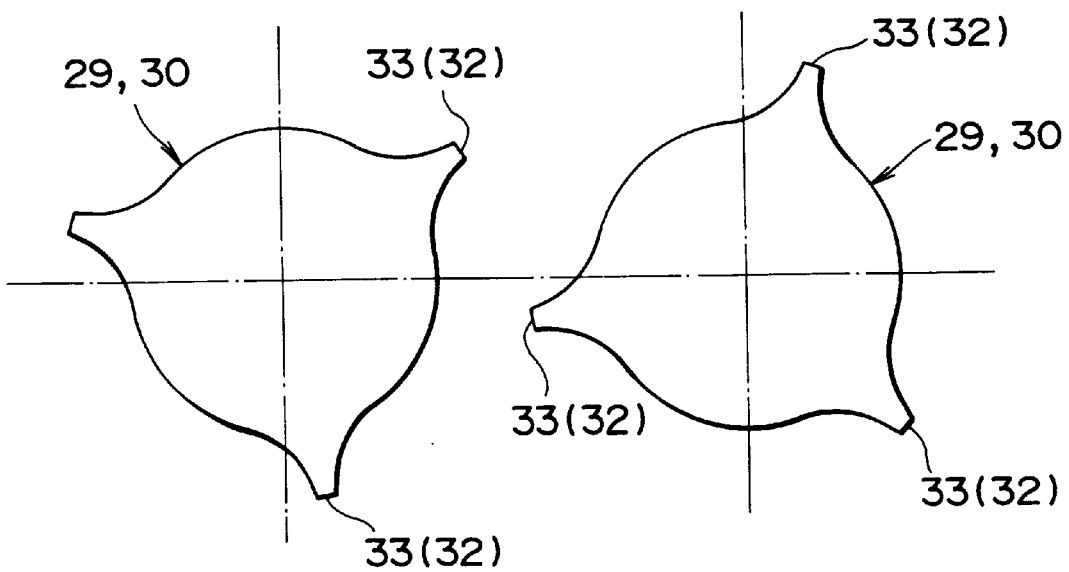
FIG. 3b is a sectional view taken on line 3b—3b in FIG. 1.

As shown in FIGS. 2 and 3a, the discharge section 27 of each rotor 4 is constituted by splining three short cylinder-like discharge segments 29, 30 and 31 to the outer peripheral portion of a shaft body 4A which constitutes a core of the rotor 4. The discharge segments 29, 30 and 31 are each formed at an approximately one third of the rotor axial length in the discharge area 28 and they each have three discharge flights 32 projecting radially outwards at intervals of 120° in the circumferential direction.

The discharge flights 32 of the first segment 29 located on the most upstream side and of the second segment 30 positioned centrally, out of the three discharge segments, are formed as parallel flights 33 extending in parallel with the rotor axis direction, while the discharge flights 32 of the third segment 31 located on the most downstream side are formed as twist flights 34 which are inclined in a direction of extruding the kneaded material toward the opposite end (viscoseal 23 side) of the chamber 2.

In this embodiment, as shown in FIG. 2, each discharge section 27 is provided with the twist flights 34 in an area from the most downstream end thereof up to a one-third upstream position in the same section and is provided with the parallel flights 33 in an area from the downstream end of twist flights 34 up to remaining two-third position, that is, up to the most upstream end of the discharge section.

In the continuous kneader 1 shown in FIGS. 1 to 4, the twist angle θ (see FIG. 9b) of each twist flight relative to the rotor axis direction is set at approximately 40°.

Although in the illustrated embodiment an upstream end of the twist flight 34 is contiguous to the parallel flight 33, both may be discontinuous.

Further, as will be shown also in another embodiment to be described later, the discharge flights 32 in each discharge section 27 may be constituted by twist flights 34 extending throughout the whole axial range of the discharge section. Although each discharge section 27 in this embodiment is constituted by three discharge segments 29, 30 and 31 as described above, the discharge section 27 may be constituted as a section integral with the associated rotor 4.

For kneading a material in the continuous twin-screw kneader 1 of the above construction, first a powdered material to be kneaded, which may contain an inorganic filler, is fed into the kneader from the supply port 13. In the first stage 3A, the material thus fed is further fed to the downstream side by the first feed section 18 and undergoes a large shear force when passing a tip portion in the kneading section 19, so that the material melts with heat generated from the material itself.

Thereafter, the melted material reaches the second feed section 20 in the second stage 3B, from which it is fed to the second kneading section 21 by a screw action of the feed section 20, in which section 21 the melted material is further kneaded and melted.

The thus kneaded and melted material passes the second kneading section 21 and is extruded to the discharge area 28, from which it is discharged to the exterior of the chamber 2 through the discharge port 15 which is open below the discharge area 28.

Figure 15:
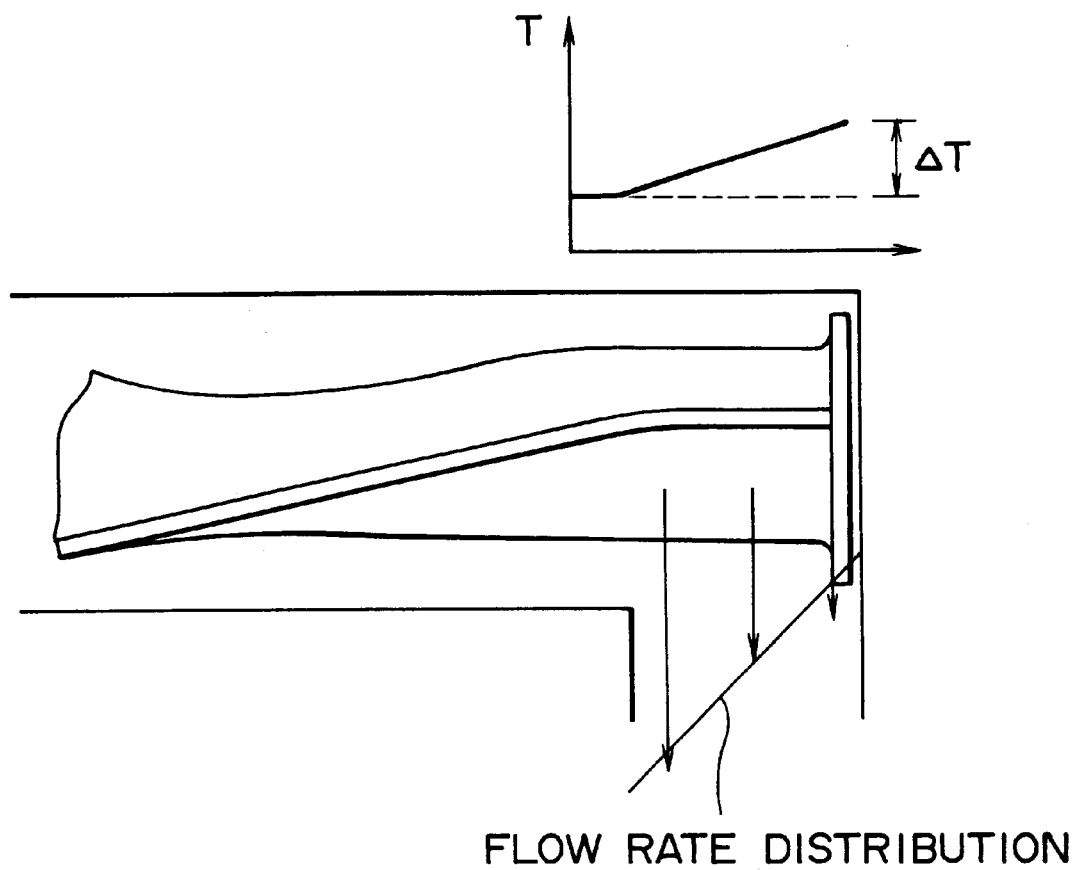
FIG. 15 is a sectional side view of a downstream portion in a conventional continuous twin-screw kneader, showing a cause of non-uniform temperatures in the discharge port.

In this case, according to this embodiment, a portion of the kneaded material present in the discharge area 28 is scraped out to the discharge port 15 while being pushed out to the opposite end side (downstream side) of the chamber 2 by the twist flights 34 formed on the most downstream side of the discharge section 27, so that the difference in discharge flow rate which occurs between the upstream portion and the downstream portion in the discharge port 15 decreases and the offset of flow rate distribution in the discharge port 15 becomes smaller than in a conventional like kneader (the one shown in FIG. 15).

Consequently, the shearing work done per unit weight imposed on the kneaded material flowing through the discharge port 15 is rendered almost uniform in the rotor axis direction, whereby the occurrence of a large temperature difference between the upstream side and the downstream side in the discharge port 15 is prevented.

Thus, in this embodiment, the resin temperature in the discharge port 15 can be rendered almost uniform, so it is possible to prevent deterioration of the kneaded material even upon accidental increase in temperature and hence the quality of the final product can be improved and it is possible to prevent the pellet length from becoming non-uniform.

Moreover, since the resin temperature in the discharge port 15 can be rendered almost uniform, it becomes easier to effect adjustment of the degree of kneading by the gate device 17 and by controlling the suction pressure in the gear pump 22.

Further, since there remain the parallel flights 33 in the discharge section 27 and the kneaded material scraping-out function is not lost, not only the occurrence of a pressure variation in the discharge port 15 is prevented, but also it is possible to prevent deterioration of the gel removing capacity caused by non-stop flow of the resin through the second kneading section 21 and subsequent arrival of the resin at the discharge port 15 from the discharge area 28.

Further, since the kneaded material present in the discharge area 28 is pushed out to the opposite end side of the chamber 2 by the twist flights 34, the kneaded material comes to be present almost uniformly on the inlet side of the viscoseal 23 and thus there also is obtained an additional effect that the sealing of the resin by the viscoseal is performed effectively.

Thus, the problem that the temperature in the discharge port of the both-end supported type continuous twin-screw kneader 1 becomes non-uniform can be solved by the present invention, so it is possible to adopt various structures for connection with the gear pump 22 without being troubled with the deterioration problem of the resin caused by non-uniform temperatures in the discharge port 15.

In this connection, FIGS. 5 to 7 show variations of connecting structures between the chamber 2 and the gear pump 22, which variations are applicable to the continuous twin-screw kneader 1 according to the present invention.

Figure 5A:
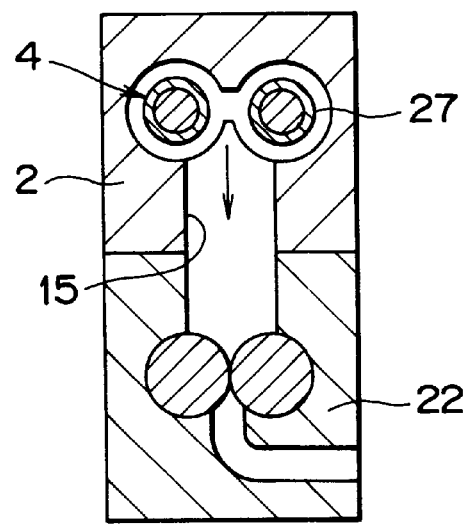
FIG. 5a is a cross sectional view showing a variation of a connection structure between a chamber and a gear pump, the gear pump being disposed horizontally and connected directly to the underside of the chamber which has a downward discharge port.
Figure 5B:
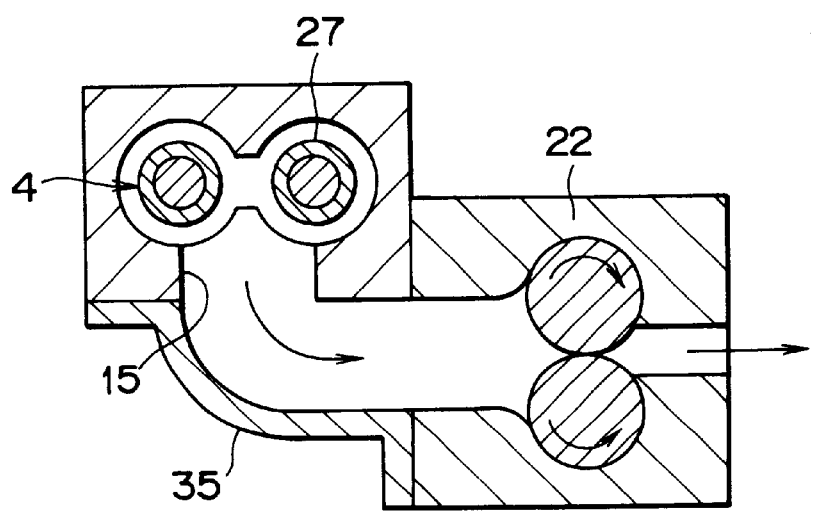
FIG. 5b shows an example in which an L-shaped pipe is connected to the underside of a chamber having a downward discharge port and a gear pump disposed vertically is connected to the said pipe.

In FIG. 5a, a gear pump 22 disposed horizontally is connected directly to the underside of a chamber 2 which has a downward discharge port 15, while in FIG. 5b, an L-shaped pipe 35 is connected to the underside of a chamber 2 having a downward discharge port 15 and a gear pump 22 disposed vertically is connected directly to the pipe 35.

Figure 6A:
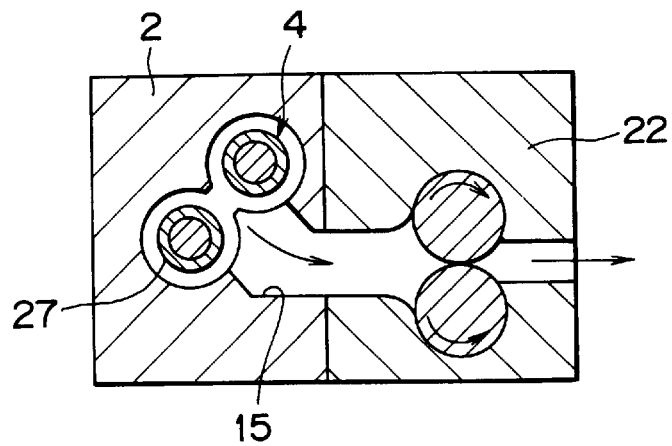
FIGS. 6a, 6b and 6c are cross sectional views showing variations of chamber-gear pump connection structures.
Figure 6B:
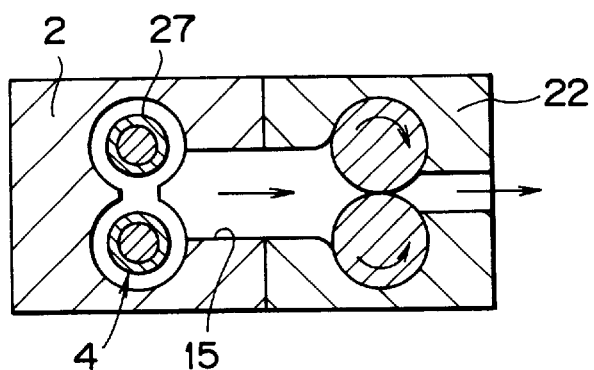
Figure 6C:
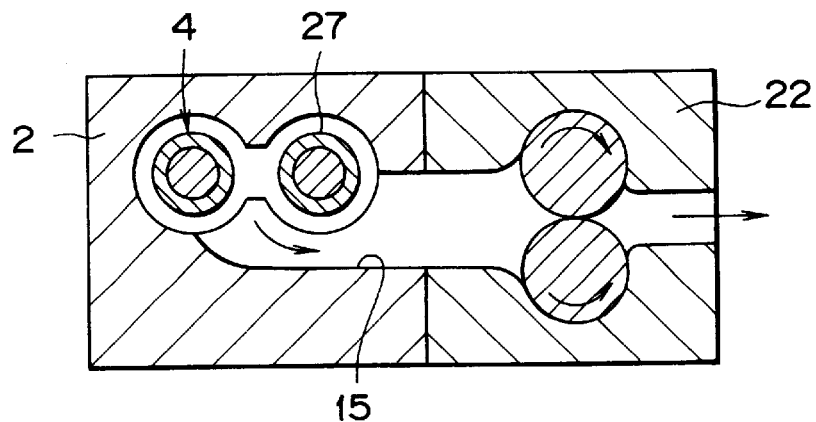

In FIG. 6a, a discharge port 15 is inclined in conformity with an inclined state of rotors 4 and a gear pump 22 disposed vertically is connected to the inclined discharge port 15. In FIG. 6b, a discharge port 15 is opened horizontally in conformity with a vertical arrangement of rotors 4 and a gear pump 22 disposed vertically is connected to the discharge port 15. In FIG. 6c, a horizontal discharge port 15 is formed in a chamber 2 which has rotors 4 arranged horizontally, and a gear pump 22 disposed vertically is connected to the discharge port 15.

FIGS. 7 show connecting structures wherein right and left kneading chambers 3 in the second stage 3B are made independent of each other.

Figure 7A:
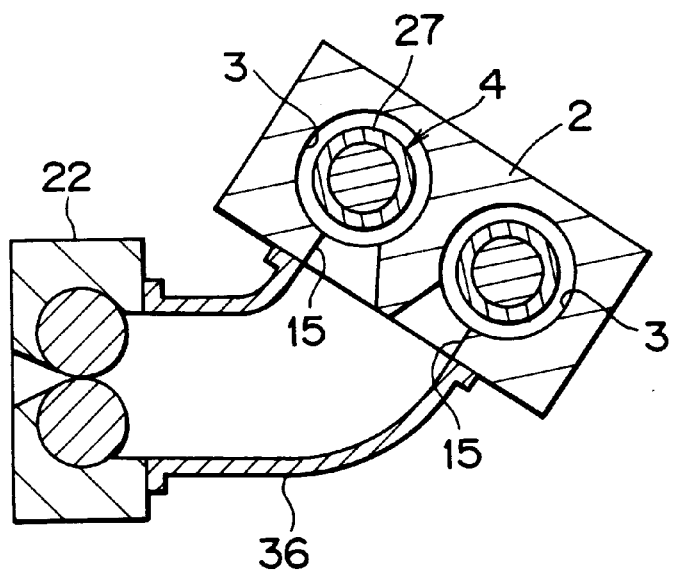
FIGS. 7a and 7b are cross sectional views showing further variations of chamber-gear pump connection structures.
Figure 7B:
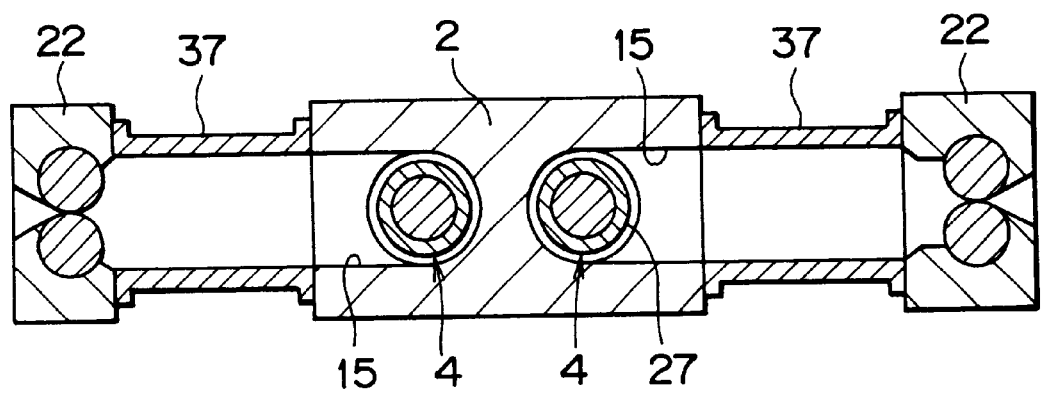

In FIG. 7a, discharge ports 15 communicating with kneading chambers 3 are inclined in conformity with an inclined state of rotors 4, an elbow 36 is connected to the inclined discharge ports 15, and a gear pump 22 disposed vertically is connected directly to the elbow 36. In FIG. 7b, discharge ports 15 communicating with kneading chambers 3 are opened respectively in right and left side faces of the chamber 2, and gear pumps 22 disposed vertically are connected respectively to the kneading chambers 3 through horizontal pipes 37.

Figure 8:
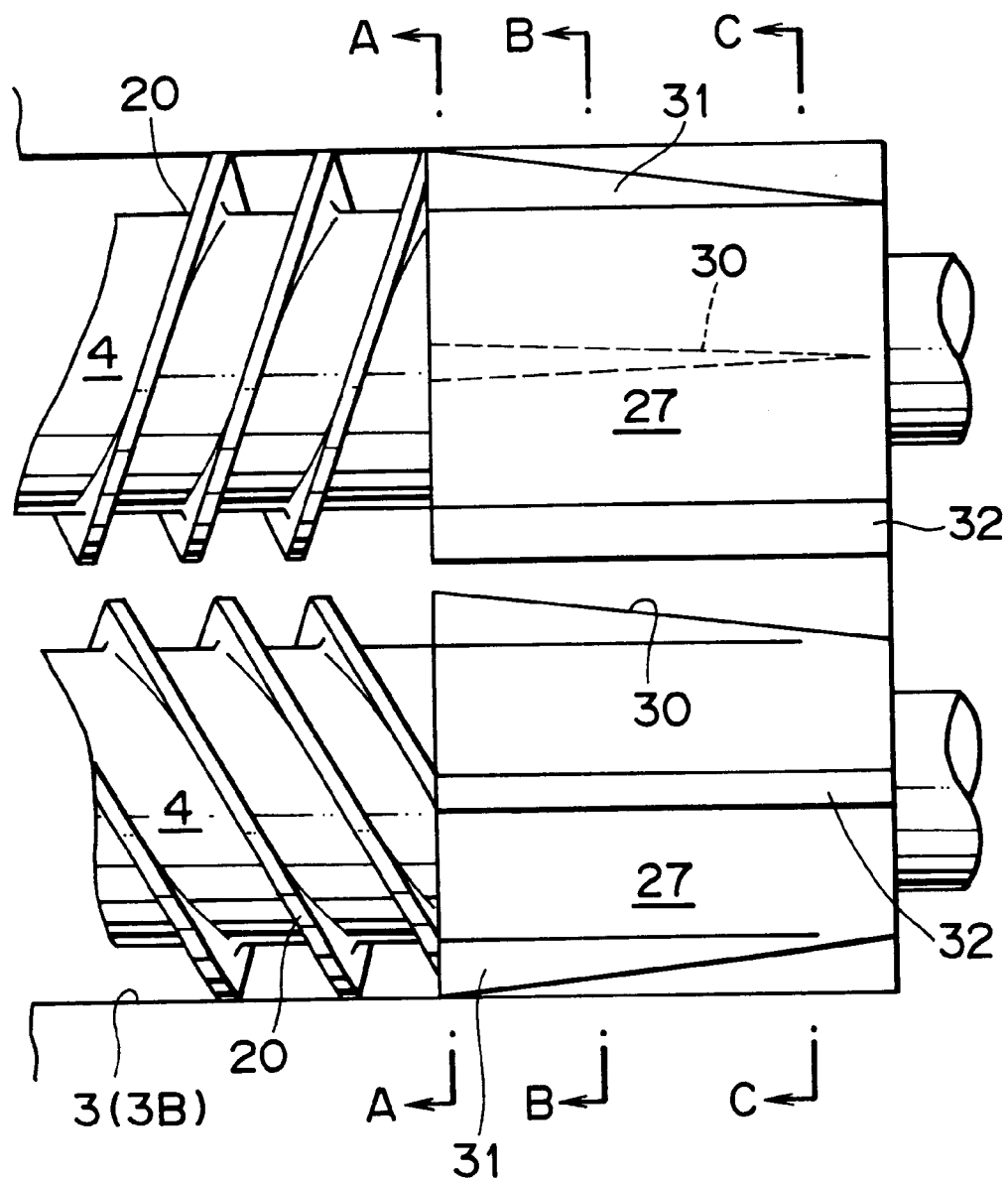
FIG. 8 is a sectional side view showing the entire structure of a continuous twin-screw kneader according to the second embodiment of the present invention.

FIG. 8 illustrates the second embodiment of the present invention.

In this embodiment the present invention is applied to a single-kneading type continuous twin screw kneader (for example, Kobe Steel's KCM or NCM series kneader) not having the gate device 17.

The previous first embodiment and this second embodiment are different in that in the former the kneading chambers 3 are divided into two stages by the gate device 17, whereas in the latter there is only one stage.

In this embodiment, as means for adjusting the degree of kneading there is adopted, not a gear pump 22 but a flapper orifice which comprises a lid member pivotally secured to the discharge port 15 and a cylinder for pivotally moving the lid member.

The above flapper orifice may also be adopted in the two-stage type continuous twin-screw kneader 1 (FIG. 4) of the first embodiment, and it is also possible to connect a gear pump 22 to the continuous twin-screw kneader of this embodiment (FIG. 8).

Other basic structural points are almost the same as in the first embodiment, so are identified by like reference numerals in FIG. 8 and detailed explanations thereof are here omitted.

It is to be understood that the above embodiments of the present invention are for the purpose of illustration and not of limitation. A technical scope of the present invention is determined by the scope of the appended claims and all the modes falling thereunder are included in the scope of the present invention.

For example, although the length of each of the discharge sections 27 adopted in the illustrated embodiments is the same as or larger than the length in the rotor axis direction of the discharge port 15, it may be a litter smaller than the length in the rotor axis direction of the discharge port 15.

The number of flights in each discharge section 27 is not limited to three. At least one such flight suffices. The discharge flights 32 which constitute the discharge section 27 may be constituted by the foregoing twist flights 34 extending throughout the whole axial range of the discharge section.

Although in the continuous twin-screw kneaders 1 of the above embodiments a pair of rotors 4 rotate in different directions, the rotating direction of rotor and the number of rotor to be used do not constitute any essential conditions in the present invention insofar as the temperature distribution of resin in the discharge port 15 which opens radially outwards of rotor 4 is made uniform.

In more particular terms, the present invention is also applicable to a continuous twin-screw kneader wherein a pair of rotors rotate in the same direction, a single-screw kneader/extruder using one rotor, and a multi-screw kneader/extruder using three or more rotors.

The following description is now provided about working examples (experimental examples) for demonstrating the effect of the present invention.

The following experiments were conducted by test-kneading a material to be kneaded actually with use the continuous twin-screw kneader of the first embodiment and by subsequent measurement of the resin temperature in the discharge port 15. Common conditions adopted in the test-kneading are as follows:

| | |
|---|---|
| Kneader used | LCM50 (FIG. 4) manufactured Kobe Steel, Ltd. |
| Number of rotor flight | 3 |
| Axial length of discharge port | 34.5 mm |
| Width of discharge port | 74 mm |
| Inside dia. of chamber | 54 mm |
| Temperature measuring Points | Downstream point A and upstream point B in the discharge port shown in FIGS. 9 |
| Material to be kneaded | HDPE (MI = 0.08) |

EXAMPLE 1

Figure 9A:
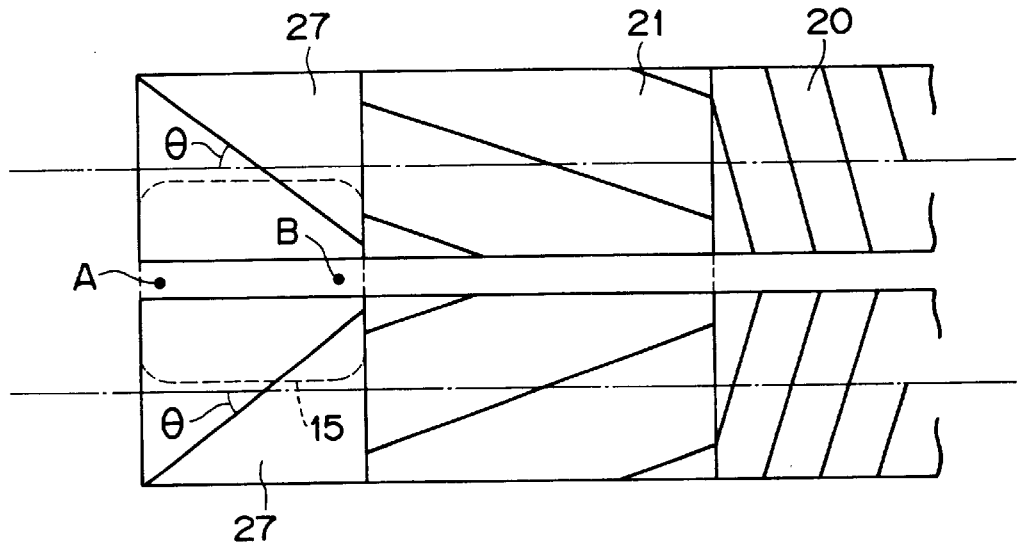
FIGS. 9a and 9b are schematic diagrams of rotors for showing the definition of a twist angle of each twist flight and that of the ratio of its length.

Under the above common conditions, first, as shown in FIG. 9a, rotors 4 each provided with a discharge section 27 having twist flights 34 throughout the whole axial range thereof were installed in a continuous kneader 1 and a check was made to see how the difference in temperature between upstream and downstream sides of a discharge port 15 was influenced by changes in the twist angle $\theta$ of each twist flight 34 relative to the rotor axis direction.

Figure 10:
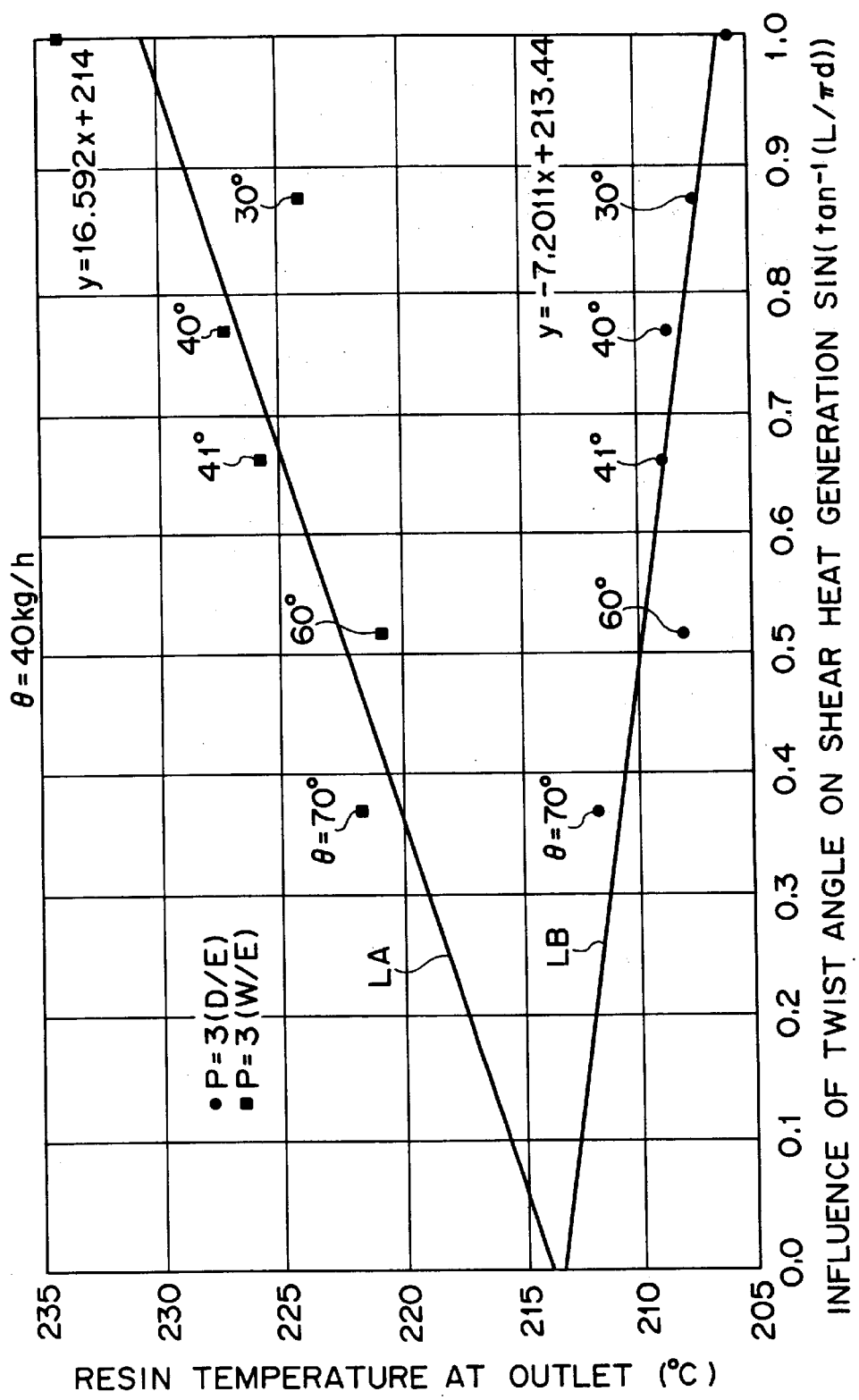
FIG. 10 is a graph showing a relation between the twist angle of the twist flight and a temperature difference in a discharge port (in the case of 40 kg/h output)
Figure 11:
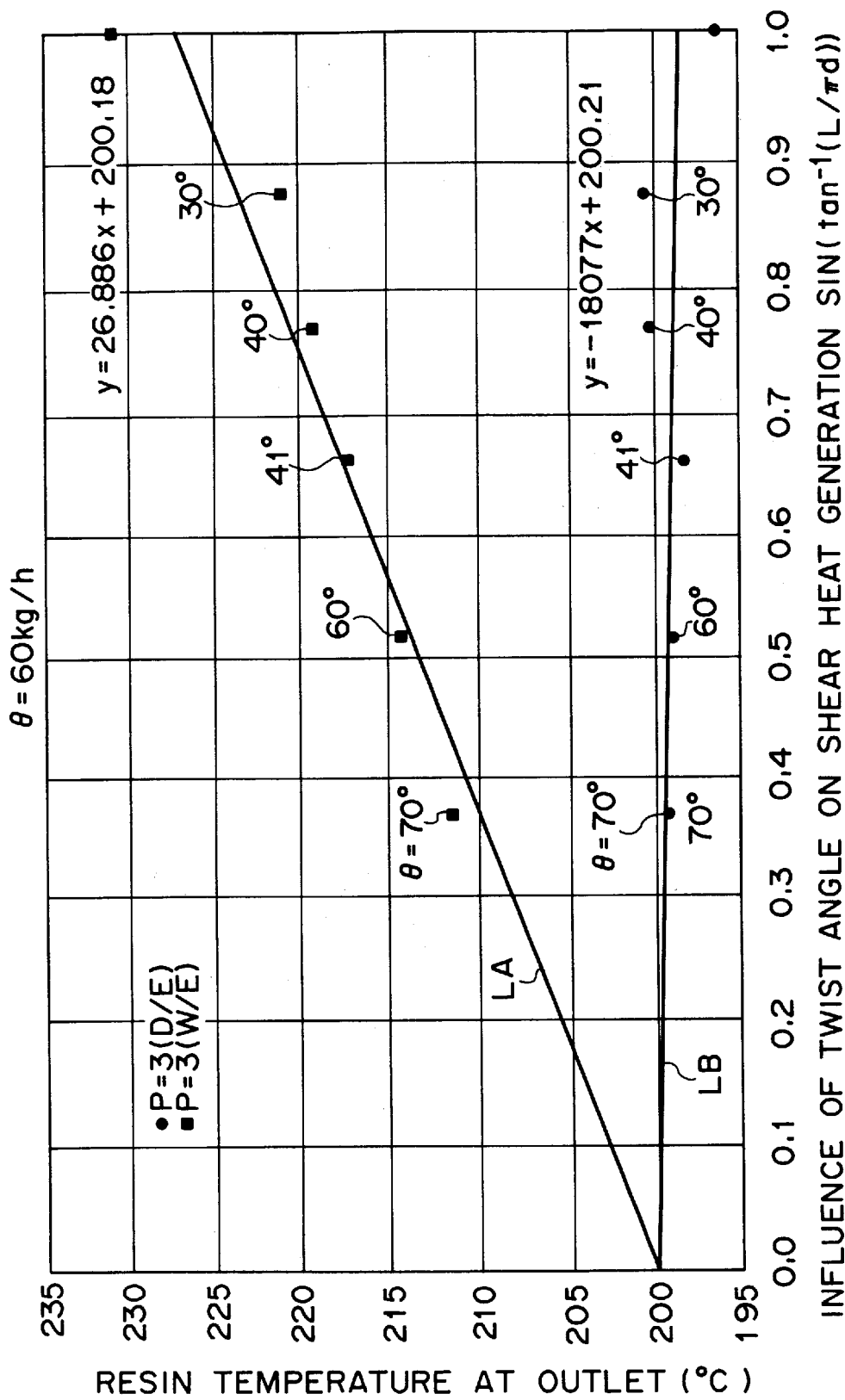
FIG. 11 is a graph similar to FIG. 10 (in the case of 60 kg/hr output)

The results obtained are as shown in the graphs of FIGS. 10 and 11. In FIG. 10, output, rotor revolutions, gate opening, and suction pressure in gear pump inlet, are set at 40 kg/h, 400 rpm, 3 mm, and 3.0 kg/cm$^2$, respectively. In FIG. 11, output is set at 60 kg/h and other conditions are the same as in FIG. 10.

In each of FIGS. 10 and 11, a straight line LB inclined rightward and downward is a linear approximation of measured temperature changes at the upstream point B, while a straight line LA inclined rightward and upward is a linear approximation of measured temperature changes at the downstream point A.

It follows that the difference in height between the straight lines LA and LB is a temperature difference which has occurred in the kneaded material present in the discharge port 15.

From the measurement results shown in FIGS. 10 and 11 it is seen that the smaller the twist angle $\theta$ of the twist flight 34 relative to the rotor axis direction, the higher the resin temperature at the downstream point A in the discharge port 15 (the opposite end side of the chamber 2) and the larger the temperature difference which has occurred in the kneaded material present in the discharge port 15. But the larger the twist angle $\theta$, the smaller the said temperature difference.

This is presumed to be because the smaller the twist angle $\theta$ of the twist flight 34, the closer the shape of the twist flight 34 to the shape of the conventional parallel flight and the smaller the amount of resin pushed against the opposite end side of the chamber 2, so the difference in the discharge flow rate which occurs between upstream and downstream sides of the discharge port 15 does not decrease so much.

If an allowable limit temperature difference $\Delta Tc$ not affording irregular pellets is set at about 25° experientially, it follows that it suffices for the twist angle to be set at 30° or more.

In other words, if the twist angle $\theta$ of the twist flight 34 is 30° or more, the resin temperature difference in the discharge port 15 can be held not larger than the allowable temperature difference ΔTc (=250°) even in the case of high output of 60 kg/cm².

EXAMPLE 2

Using the continuous kneader 1 of the same conditions as in EXAMPLE 1, a check was made to see how the number of gels formed was influenced by changes in the twist angle θ of each twist flight 34 relative to the rotor axis direction.

Figure 12:
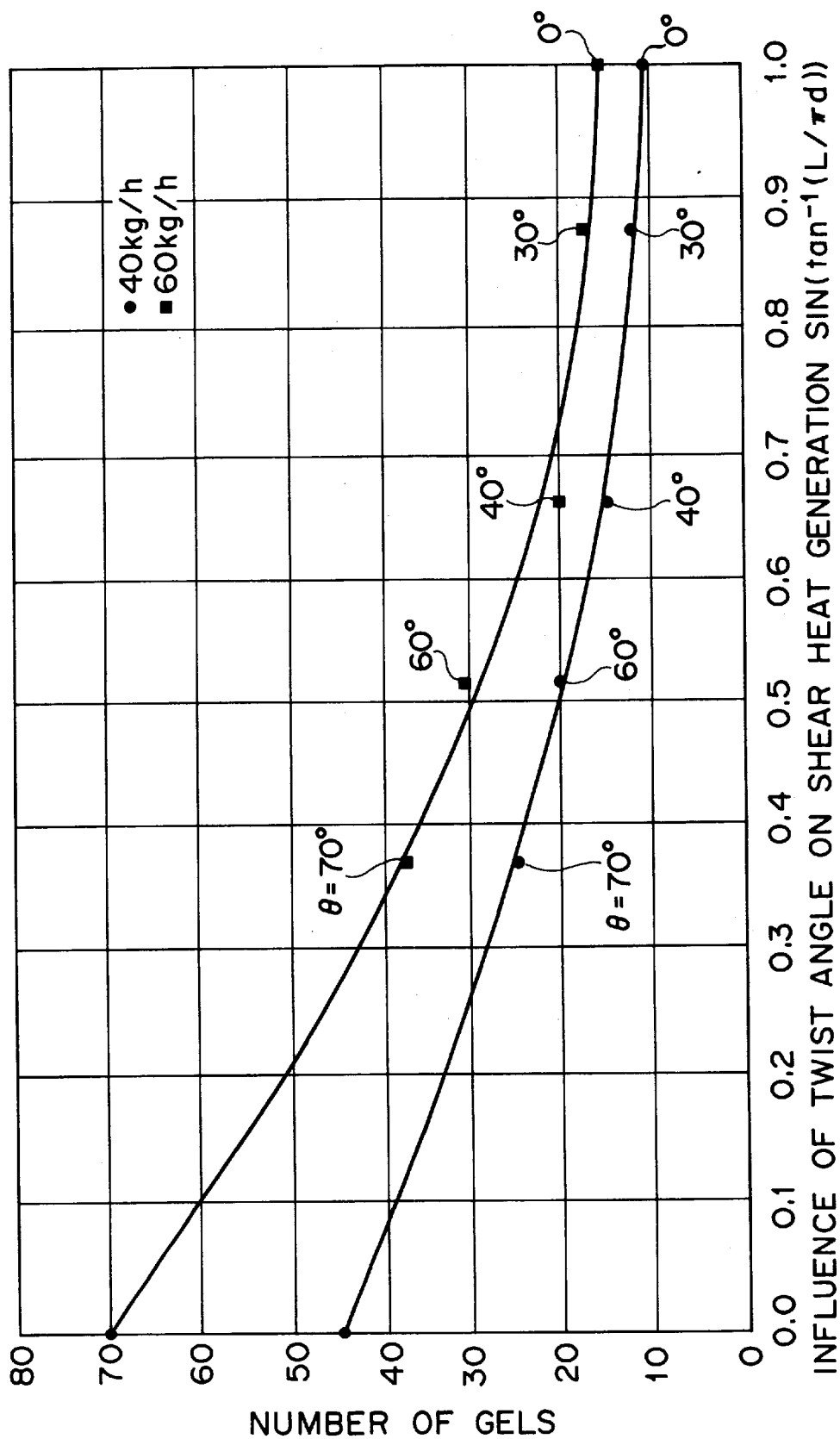
FIG. 12 is a graph showing a relation between the twist angle of the twist flight and the number of gels.

The results obtained are as shown in the graph of FIG. 12. The kneaded material was stretched in sheet form having a width of 10 cm and a length of 5 m and the number of gels formed was measured by visually counting the number of fish eyes per 30 g of the sheet.

The lower curve shown in FIG. 12 represents the result of measurement conducted under the conditions of output 40 kg/h, rotor revolutions 400 rpm, gate opening 3 mm, and suction pressure in gear pump inlet 3.0 kg/cm², while the upper curve represents the result of measurement made at a different output of 60 kg/h.

As is seen from the measurement results of FIG. 12, the larger the twist angle θ of the twist flight 34 in the rotor axis direction, the larger the number of gels formed, but the smaller the twist angle θ, the smaller the number of gels formed.

This is presumed to be because the smaller the twist angle θ of the twist flight 34, the closer the shape of the twist flight 34 to the shape of the conventional parallel flight and the larger the flow resistance to the discharge port 15, resulting in the kneaded material being prevented from passing the second kneading section 21 without stopping.

If a limit number of gels permitting the production of pellets regarded as high-quality pellets is assumed to be about 35 experientially, it follows from the measurement results of FIG. 12 that it suffices for the twist angle θ to be set at a value not larger than 70 degrees.

In other words, if the twist angle θ of the twist flight 34 is 70° or less, the number of gels formed can be kept within 35.

As is apparent from the above EXAMPLES 1 and 2, if the twist angle θ of the twist flight 34 is set at a value in the range of 30 to 70°, the difference in temperature of the kneaded material in the discharge port is minimized while suppressing the formation of gels effectively and hence it is possible to prevent the production of irregular pellets.

EXAMPLE 3

Figure 9B:
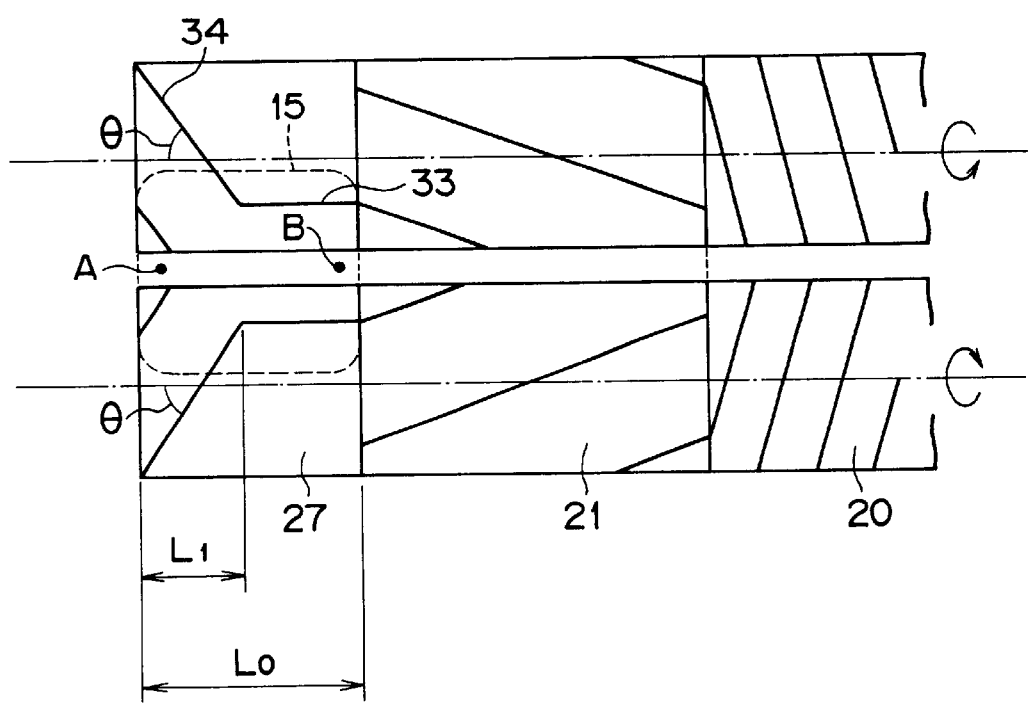

Under the foregoing common conditions, as shown in FIG. 9b, rotors 4 each provided with a discharge section 27 having twist flights 34 formed at part of the downstream side in the axial direction and also having parallel flights 33 formed at the remaining portion were installed in the continuous kneader 1 and a check was made to see how the difference in temperature between the upstream side and the downstream side in the discharge port 15 and the number of gels formed are influenced by changes in the ratio of length, L1/L0, of each twist flight 34 in the rotor axis direction relative to the discharge section 27.

The results obtained are as shown in the graphs of FIGS. 13 and 14. In FIGS. 13, output, rotor revolutions, gate opening, and suction pressure in gear pump inlet, are set at 40 kg/h, 400 rpm, 3 mm, and 3.0 kg/cm², respectively.

In FIGS. 14, the same conditions as in FIGS. 13 are adopted except that the output is set at 60 kg/h.

Figure 13A:
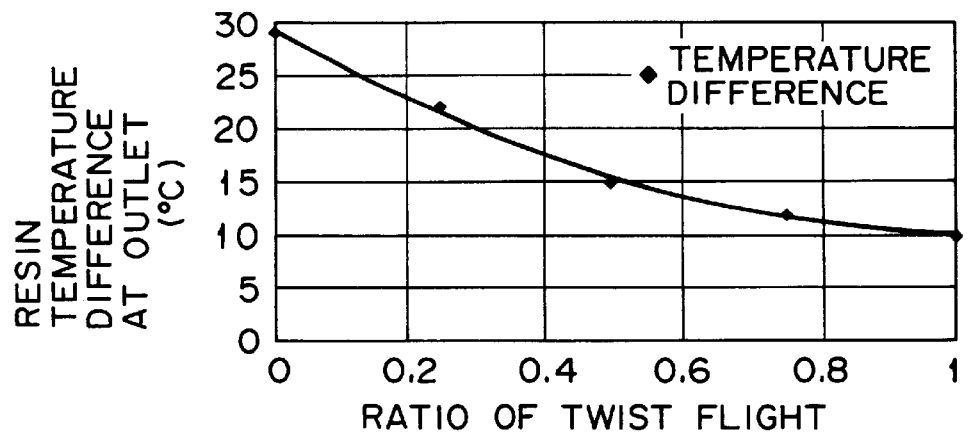
FIG. 13a is a graph showing a relation between the twist angle of the twist flight and a temperature difference in the discharge port and FIG. 13b is a graph showing a relation between the twist angle of the twist flight and the number of gels (in the case of 40 kg/h output)
Figure 13B:
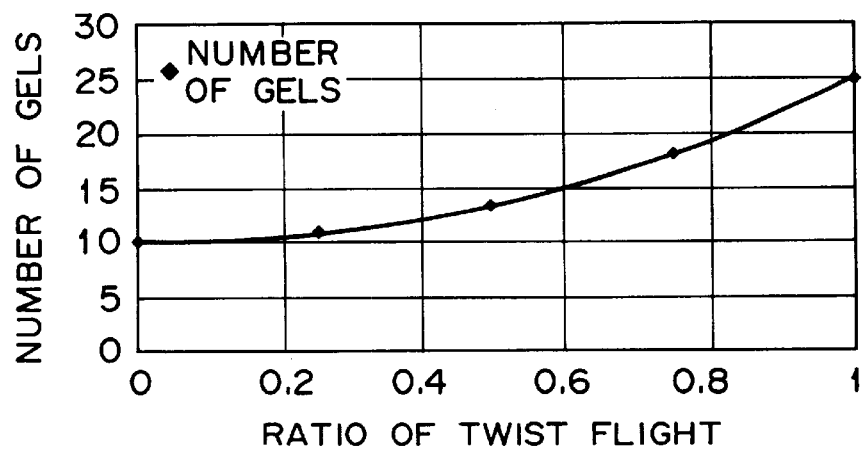

Reference to the results of FIGS. 13a and 13b shows that in the case of a relatively low output of 40 kg/h, if the length ratio L1/L0 of each twist flight 34 is set at 0.1 or more, the temperature difference in the discharge port 15 is within the foregoing allowable temperature difference ΔTc (=25° or so) and that the number of gels is also within the allowable number (=35 or so).

Figure 14A:
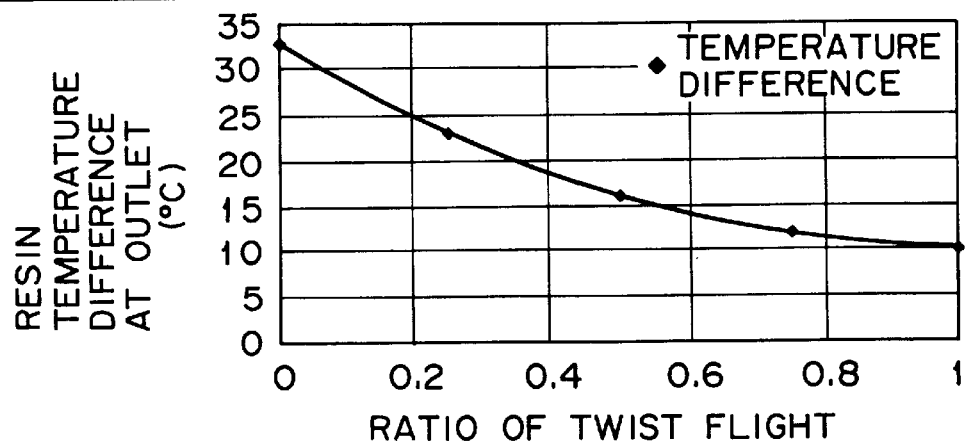
FIG. 14a is a graph showing a relation between the twist angle of the twist flight and a temperature difference in the discharge port and FIG. 14b is a graph showing a relation between the twist angle of the twist flight and the number of gels (in the case of 60 kg/h output)
Figure 14B:
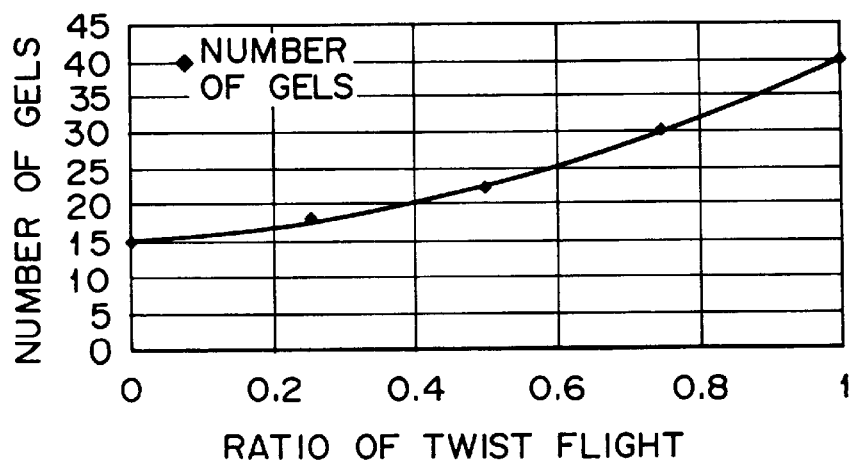

On the other hand, in the case of a relatively high output of 60 kg/h, as shown in FIGS. 14a and 14b, in order to suppress the temperature difference in the discharge port 15 within the allowable temperature difference ΔTc (=25° or so) which is the limit of preventing the formation of irregular pellets, it is necessary that the length ratio L1/L0 of the twist flight 34 be set at a value of 0.2 or more. Further, for suppressing the number of gels within the allowable number (=35 or so), it is necessary to set the length ratio L1/L0 of the twist flight 34 at a value of 0.8 or less.

Thus, it is seen that if the length ratio L1/L0 of the twist flight 34 is set at a value in the range of 0.2 to 0.8, the temperature difference in the kneaded material is minimized in the discharge port while suppressing the formation of gels effectively and it is possible to prevent pellets from becoming irregular, even in kneading of a relatively large output.

According to the present invention, as set forth above, the temperature difference in the rotor axis direction of the kneaded material in the discharge section of each rotor is minimized and the product quality can be improved while effectively preventing malfunction of a gear pump caused by a pressure variation in the discharge port and also effectively preventing deterioration of the gel removing capacity caused by non-stop passing of resin through the discharge port.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

The entire disclosure of Japanese Patent Application No. 10-146066 filed on May 27, 1998 including specification, claims, drawings and summary are incorporated herein by reference in its entirety.

We claim:

1. A continuous kneader, comprising:
    a kneader body having a chamber and a radial discharge port defining a discharge area;
    a rotor in said chamber and having a feed section for feeding a material to be kneaded in a downstream direction to a kneading section, said kneading section being contiguous to said discharge area and being provided for melting and kneading said material to be kneaded into a kneaded material; and
    said kneader further having a discharge section disposed within said discharge area, in which the kneaded material is discharged with rotation of the rotor, said discharge section having a twist flight on an outer peripheral surface of at least a downstream most portion of said rotor in said chamber, said twist flight being within said discharge area and being inclined in a direction such that said kneaded material is advanced in the downstream direction, said discharge section further having a parallel flight located upstream of said twist flight.

2. A kneader according to claim 1, wherein said twist flight has a twist angle of 30° to 70° relative to the kneader axis direction.

3. A continuous kneader according claim 2, said rotor being supported at both axial ends thereof, said chamber having at one end portion thereof a material supply port for supplying the material to be kneaded to said feed section of the rotor.

4. A kneader according to claim 1, wherein the ratio of length of said twist flight to said discharge section in the kneader axis direction is set at a valve of 0.2 to 0.8.

5. A continuous kneader according to claim 4, said rotor being supported at both axial ends thereof, said chamber having at one end portion thereof a material supply port for supplying the material to be kneaded to said feed section of the rotor.

6. A continuous kneader according to claim 1, said rotor being supported at both axial ends thereof, said chamber having at one end portion thereof a material supply port for supplying the material to be kneaded to said feed section of the rotor.

* * * * *